United States Patent [19]

Iyama et al.

[11] B 3,999,218
[45] Dec. 21, 1976

[54] VIDEO SIGNAL RECORDING AND REPRODUCING APPARATUS FOR STOP MOTION PICTURE

[75] Inventors: Akiyoshi Iyama, Sagamihara; Toshi Ito, Tokyo; Katsutoshi Tajima; Hiroshi Ishibashi, both of Yokohama, all of Japan

[73] Assignee: Hitachi, Ltd., Japan

[22] Filed: Apr. 4, 1973

[21] Appl. No.: 347,661

[44] Published under the second Trial Voluntary Protest Program on March 16, 1976 as document No. B 347,661.

[30] Foreign Application Priority Data

Apr. 7, 1972  Japan .................. 47-34380

[52] U.S. Cl. ....................... 360/35; 360/10
[51] Int. Cl.² ............................ H04N 5/78
[58] Field of Search ..... 178/6.6 FS, 6.6 A, 6.6 DD; 360/10, 35, 33

[56] References Cited

UNITED STATES PATENTS

| | | | |
|---|---|---|---|
| 2,955,157 | 10/1960 | Young | 178/6.6 A |
| 3,026,369 | 3/1962 | Lohmann | 178/6.6 A |
| 3,397,283 | 8/1968 | Stosberg | 178/6.6 A |
| 3,501,584 | 3/1970 | Machein | 178/6.6 A |
| 3,518,366 | 6/1970 | Phan | 178/6.6 A |
| 3,637,928 | 1/1972 | Poulett | 178/6.6 DD |
| 3,732,362 | 5/1973 | Kinjo | 178/6.6 FS |
| 3,812,522 | 5/1974 | Izura | 360/10 |

OTHER PUBLICATIONS

"Reviewing Slow-Motion Disc Principles," by Lee Stratton; Broadcast Engineering; Feb., 1969, pp. 14–18.

Primary Examiner—Bernard Konick
Assistant Examiner—Alan Faber
Attorney, Agent, or Firm—Craig & Antonelli

[57] ABSTRACT

A video signal recording and reproducing apparatus for stop motion pictures comprises a memory device for recording a signal, for example, a signal during the period of time of one field corresponding to one scene from telecast video signals, means for extracting a signal corresponding to any one instantaneous scene from video signals produced from a television receiver set or the like for recording on said memory device, and means for effecting repeated reproduction of the recorded signal to produce a video signal for a stop motion picture. The memory device is embodied by a field memory device provided with a magnetic recording medium such as a magnetic disc or magnetic sheet effecting one revolution during the period of time of one field. The employment of the video signal recording and reproducing apparatus for stop motion picture permits a receiver to view, as a stop motion picture, any instantaneous motion picture he desires during the period of viewing the telecast. Recording is restricted to either odd or even fields. As a consequence, previously recorded still frames can be recorded over by a new signal without producing moire noise on playback. Thus, an erase head is not required to remove unwanted still frames from the memory.

8 Claims, 16 Drawing Figures

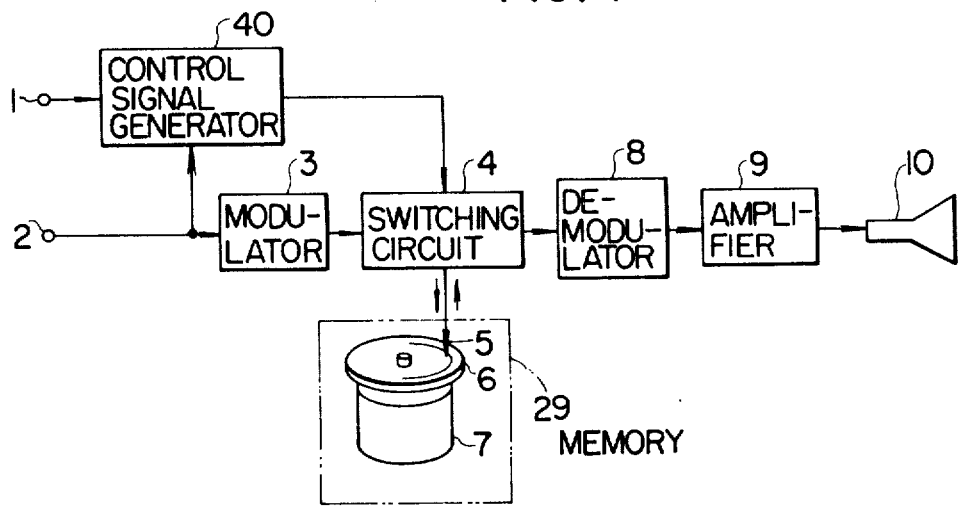
FIG. 1
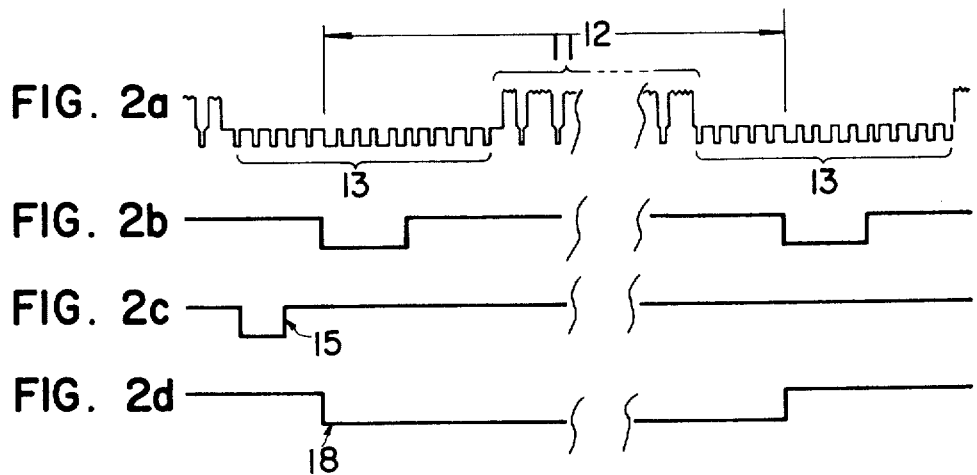
FIG. 2a
FIG. 2b
FIG. 2c
FIG. 2d

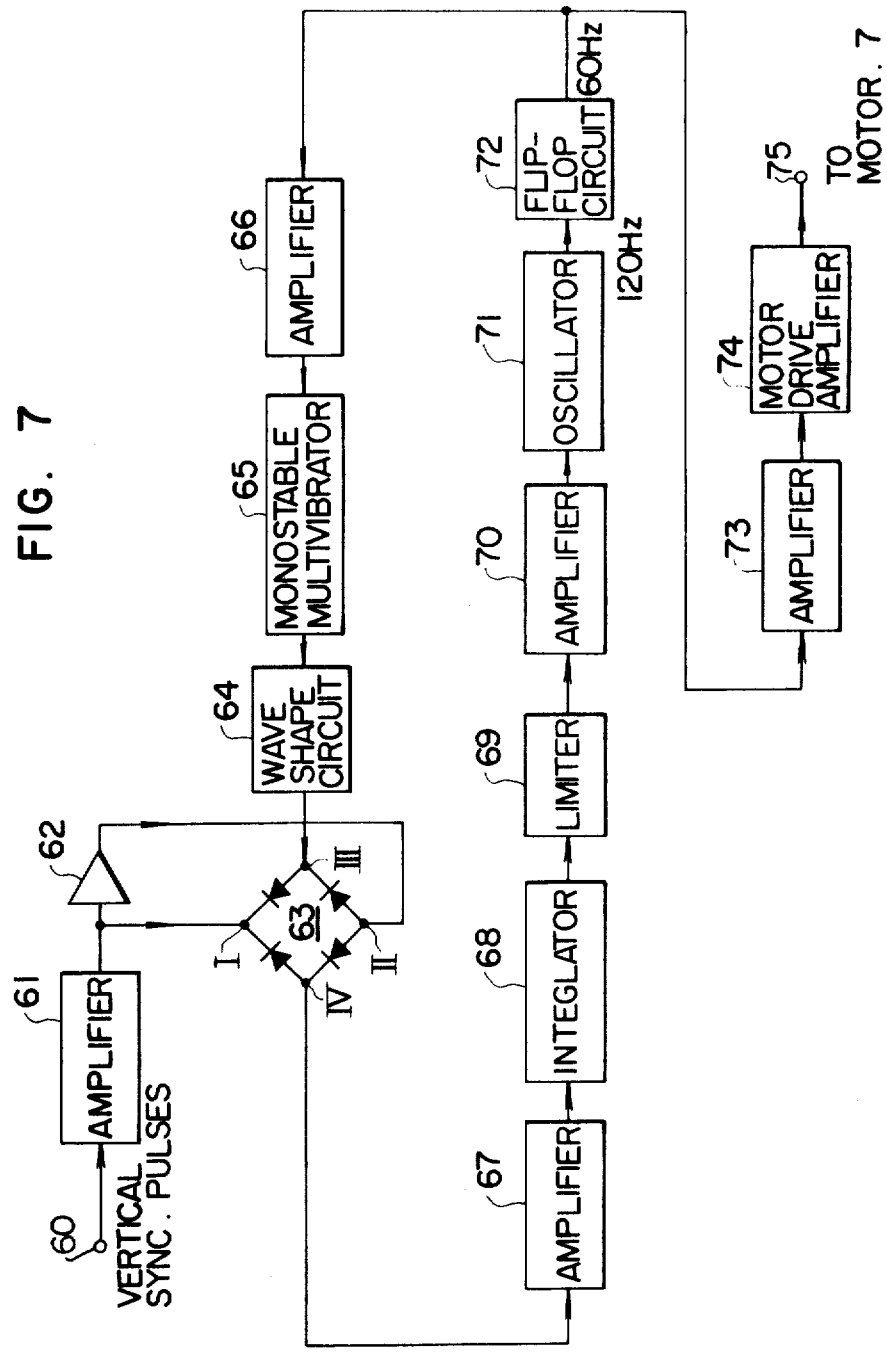

VIDEO SIGNAL RECORDING AND REPRODUCING APPARATUS FOR STOP MOTION PICTURE

The present invention relates to a video signal recording and reproducing apparatus, and more particularly to a video signal recording and reproducing apparatus for stop motion pictures in which information from one scene of received video signals varying with the lapse of time is extracted at any time for recording and for reproducing to produce a stop motion picture.

The present invention is applicable preferably to a television receiver set.

Conventionally, in such an apparatus as a video tape recorder, efforts have been made in which the stop motion picture is reproduced by stopping the advancement of a magnetic tape during a reproducing operation. The reproduction of the stop motion picture for a long period of time, however, disadvantageously results in damage to the recording medium, and leads to the drawbacks that switching operations from recording to reproducing are complicated, requiring much time and it is difficult to produce excellent pictures because the video tape recorder was not originally designed to reproduce a stop motion picture.

An object of the present invention is to remove the above-mentioned drawbacks of the prior art and to produce a stop motion picture of high quality for a long time with a simple operation.

Another object of the present invention is to provide a novel television receiver set capable of stopping and viewing any one instantaneous scene from motion pictures in a received telecast or the like.

In order to attain the above-mentioned objects, the present invention employs a magnetic disc memory device to extract a video signal corresponding to one scene, for example, one field from successive video signals. The employment of the magnetic disc memory device having a magnetic disc effecting one revolution during the period of time of one field permits a stable video signal for the stop motion picture to be produced by effecting repeated reproduction. Vertical synchronizing signals contained in the successive video signals are employed to take out the video signal corresponding to one field, to initiate and finish the recording, and to control the initiating operation of the reproduction.

The video signal recording and reproducing apparatus for stop motion pictures according to the present invention, when used in combination with the television receiver set, provides a novel television receiver set capable of producing moving pictures in response to received television as well as any instantaneous stop motion picture.

The present invention will be described hereunder by way of embodiments, in which FIG. 1 is a block diagram showing an embodiment according to the present invention;

FIG. 2a to FIG. 2d are views of waveforms showing an operational signal of the embodiment as shown in FIG. 1;

FIG. 7 is a detailed block diagram of a motor driving circuit as shown in FIG. 6.

Figure 3:
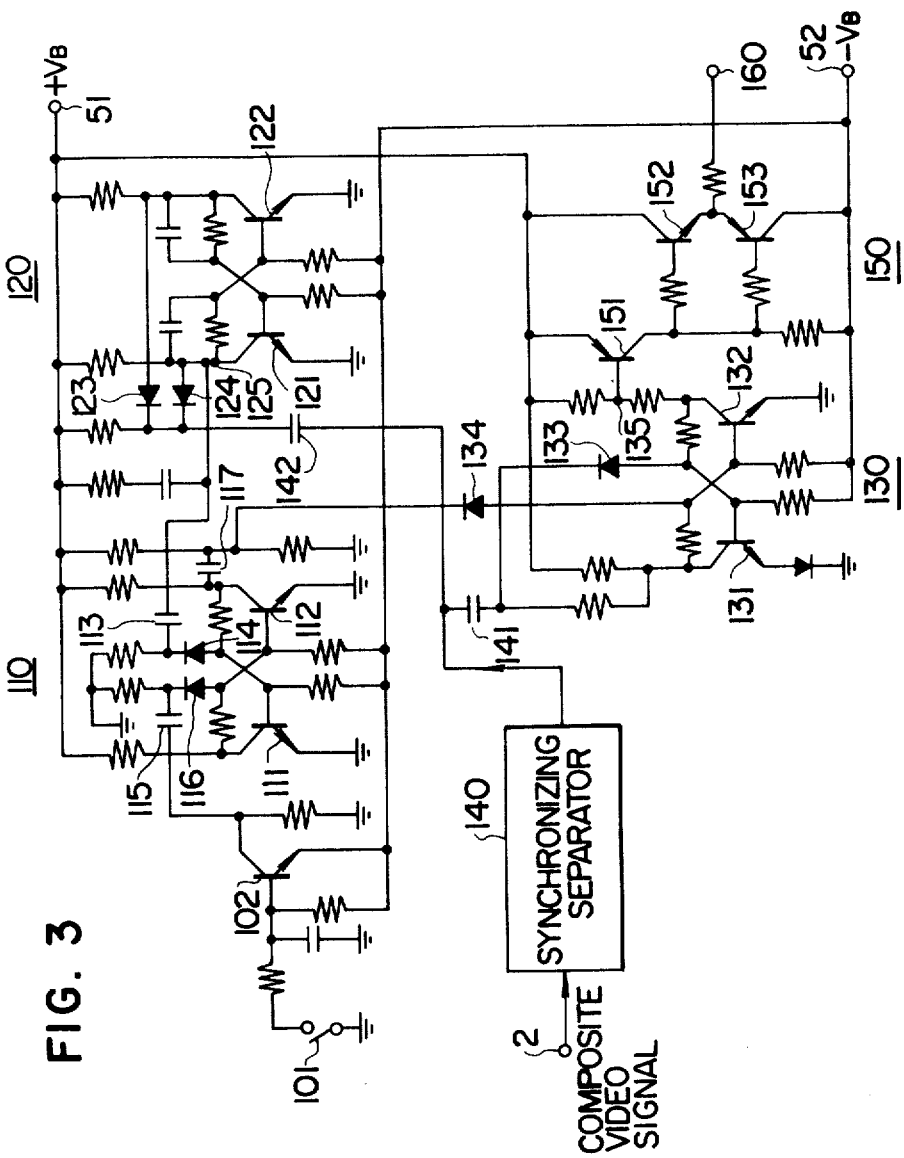
FIG. 3 is a circuit diagram showing a particular embodiment of a control signal generator 40 as shown in FIG. 1.

In FIG. 1, a reference numeral 1 shows an input terminal to which a signal for instructing the recording is applied to extract one motion picture from successive video motion pictures. The signal for instructing the recording is produced by a viewer's instruction. The numeral 2 shows an input terminal to which regular successive video signals are applied, 40 shows a control signal generator for effecting control of the recording and reproducing, 3 shows a modulator for effecting modulation and anmplification, 4 shows a switching circuit, and 29 shows a magnetic disc memory device comprising a magnetic head 5, a magnetic disc 6 and a motor 7 for effecting rotation of the magnetic disc 6. The numeral 8 shows a demodulator for effecting demodulation and amplification, 9 shows a video signal amplifier and 10 shows a cathode-ray tube.

FIG. 2a shows a waveform of the successive video signals including synchronizing signals, motion picture signals indicated by 11, and vertical blanking signals indicated by 13. The period indicated by 12 just corresponds to the period of one field. In FIG. 2b there are shown the vertical synchronizing signals separated from the signals of FIG. 2a.

The video signal applied to the input terminal 2 is frequency-modulated and amplified by the modulator 3 so as to be suitable for recording. When the stop motion picture is to be produced, a pulse 15 serving as an instructional signal as shown in FIG. 2c is applied to the input terminal 1. The application of the pulse 15 to the control signal generator 40 causes the generation of a pulse 18 as shown in FIG. 2d which is set by a vertical synchronizing pulse first appearing subsequent to the application of the pulse 15 and is reset by the following vertical synchronizing pulse. The application of the pulse 18 to the switching circuit 4 causes the video signal modulated and amplified by the modulator 3 to be applied to the magnetic head 5 to record the video signal on the magnetic disc 6 only during the period of the pulse width of the pulse 18 which corresponds to the period of one field. When the period of the pulse 18 is terminated, the switching circuit 4 is immediately changed-over to reproduce the signal recorded on the magnetic disc 6 by means of the magnetic head 5. The reproduced signal is then applied to the demodulator 8 for demodulation and amplification to a suitable level, and is displayed as a picture on the cathode-ray tube 10 through the video signal amplifier 9. So far as no new pulse is applied to the input terminal 1, the signal recorded on the magnetic disc 6 is repeatedly reproduced, and continues to reproduce the stop motion picture of one field on the cathode-ray tube 10. When the motion picture to be reproduced is to be changed, the pulse 15 as shown in FIG. 2c is applied to the input terminal 1. The application of the pulse 15 to the terminal 1 causes the information hitherto recorded to be erased and the video signal corresponding to one field to be newly recorded on the magnetic disc 6 at the same time and then repeatedly reproduced.

In this manner, any one instantaneous scene from the video signals of the moving picture can be recorded by a simple operation, for example, by operating a push button switch and can be reproduced as a stop motion picture as long as required.

In the embodiment described above, only one magnetic head 5 is employed for both recording and reproducing without providing any erasing head for erasing the previously recorded information therefrom in effecting the recording of renewed information. The erasing head can, however, be omitted with the result of a simplified mechanism in the case where a magnetic layer of the magnetic disc 6 is very thin. It will be apparent that the erasing head may be provided in the present invention.

The essential circuits will be herein fully described. FIG. 3 is a circuit diagram showing a particular embodiment of a control signal generator 40 in the block diagram so shown in FIG. 1, while FIGS. 4a to 4f are views of waveforms for illustrating the operation of the generator 40.

The control signal generator 40 comprises three flip-flop circuits 110, 120 and 130, a synchronization separator 140, an output circuit 150, and a switch 101 for producing an instructional signal. The synchronization separator 140 is adapted to separate the vertical sychronizing signal from the composite video signal and may comprise a separator circuit such as normally included in the common television receiver set. The output signal from the synchronization separator 140 as shown in FIG. 3 is the vertical synchronizing pulse of negative polarity. The vertical synchronizing pulse is applied to the flip-flop circuits 130 and 120 through capacitors 141 and 142. The vertical synchronizing pulse passing through the capacitor 141 is then applied to the base of one transistor 131 forming the flip-flop circuit 130 through a diode 133. As a result, the transistor 131 is always rendered cut-off while a transistor 132 is held conductive.

The vertical synchronizing signal passing through the capacitor 142 is, on the other hand, applied to transistors 121 and 122 constituting the flip-flop circuit 120 through diodes 123 and 124. Consequently, the transistors 121 and 122 are alternately changed to the conductive and non-conductive states for every time of the application of the vertical synchronizing pulse thereto. As a result, a pulse signal having a half frequency of the vertical synchronizing pulse is produced at the collector of transistor 125. The pulse signal has a frequency of 30 Hz for a vertical synchronizing signal having the frequency of 60 Hz. The pulse signal is applied to the base of transistor 111 consituting the flip-flop circuit 110 through a capacitor 113 and a diode 114 to hold the transistor 111 in the cut-off state. Thus, the flip-flop circuit 110 usually has the transistor 111 cut off and the transistor 112 rendered conductive.

An output circuit 150 comprises transistors 151, 152 and 153. In a normal state, the transistor 132 of the flip-flop circuit 130 is conductive as mentioned above, so that the transistor 151 is also conductive with the collector potential of the transistor 151 being at the level adjacent to a positive voltage $+V_B$ of a power supply. This, therefore, brings the circuit to the state that the transistor 152 is conductive while the transistor 153 is non-conductive. As a result, at an output terminal 160 there develops a voltage the level of which is near the positive voltage $+V_B$ of the power supply.

Figure 4A:
FIG. 4a to FIG. 4f are views of waveforms showing signals produced at essential portions of the circuit of FIG. 3.
Figure 4B:
Figure 4C:
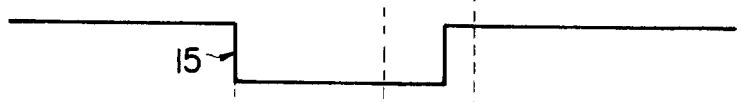
Figure 4D:
Figure 4E:
Figure 4F:
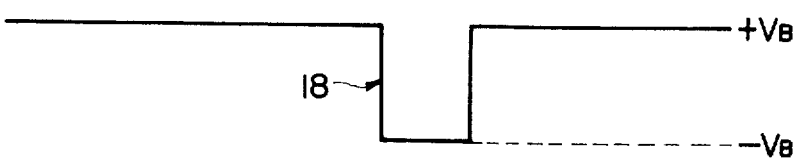

An operation of the circuit upon the closing of the switch 101 will be described in conjunction with the waveforms of FIG. 4. A series of pulses having the waveform as shown in FIG. 4a are generated from the synchronization separator 140, and trigger the flip-flop circuit 120 to generate a signal having the waveform as shown in FIG. 4b. The flip-flop circuit 110 is always reset by the trailing edge of the pulse wave shown in FIG. 4b to hold the collector of the transistor 112 in the flip-flop circuit 110 at the level adjacent to ground potential. In this state, the closing of the switch 101 causes a voltage having the waveform as shown in FIG. 4c to develop at the collector of the transistor 102. The period during which the level of the voltage is reduced corresponds to that during which the switch 101 is closed, so that it depends upon the switch operation. The signal is then applied to the base of the transistor 112 through the capacitor 115 and the diode 116, theeby rendering the hitherto conductive transistor 112 cut-off by the trailing edge of the waveform shown in FIG. 4c while rendering the transistor 111 conductive. This state remains unchanged until the signal of the nagatively changing waveform is applied to the flip-flop circuit 110 through the capacitor 113. Thus, the voltage having the waveform as shown in FIG. 4d is produced from the collector of the transistor 112. The trailing edge variation in the waveform shown in FIG. 4d is transmitted to the base of the transistor 132 of the flip-flop circuit 130 through the capacitor 117 and the diode 134, thereby cutting off the transistor 132 and rendering the transistor 131 conductive. To the flip-flop circuit 130 there is always applied the vertical synchronizing signal as shown in FIG. 4a to reset the circuit so as to cut off the transistor 131 and to render the transistor 132 conductive, so that the output waveform from the flip-flop circuit 130 as shown in FIG. 4e is generated at a resistor branching point located at the collector side of the transistor 132. It will be, therefore, appreciated that the pulse width of the signal shown in FIG. 4e corresponds to one period of the vertical synchronizing signal. The transistor 151 is cut off only during this period, so that a voltage of the waveform as shown in FIG. 4f is produced at the output terminal 160. In other words, the closing of the switch 101 permits one pulse having one vertical cycle as shown in FIG. 4f to be generated in synchronism with the vertical synchronizing signal. The application of this pulse to the switching circuit 4 as a gate signal allows the video signal corresponding to one field to be taken out for recording on the magnetic disc memory device 29.

Previously, the description has been made in that when the instructional signal 15 is applied to the control signal generator 40, the gate pulse is generated in synchronism with the first vertical synchronizing signal developing thereafter. In this respect, however, the circuit as shown in FIG. 3 is different to some extent. This is that the gate pulse does not always rise in response to the first appearing vertical synchronizing pulse after the application of the instructional signal 15 because the rise of the gate pulse is effected, as shown in FIG. 4, due to the triggering operation of the trailing edge of the pulse wave as shown in FIG. 4b after the instructional signal 15 is generated by closing the switch 101. In other words, the rise of the gate pulse is in time with every other vertical synchronizing pusle. The reason for such an arrangement is as follows: the arrangement in which the rise of the gate pulse is always effected by the first vertical synchronizing signal subsequent to the application of the instructional signal 15 cannot provide the decision that the field of the video signal extracted by the thus generated gate pulse is either one of two fields constituting one frame because the instructional signal is applied at any instant. For this reason, an inconvenience arises when the recorded field of the video signal is the field appearing in the order of an even number and the field of the video signal to be next recorded lies in the order of an odd number. That is, as mentioned above, the previously recorded signals are erased by the signals to be recorded in the case of the non-provision of an erasing head on the magnetic disc memory device, so that the previously recorded signals can not be completely erased as the case may be. For this reason, a disturbance which is known as "moire noise" takes place at a central portion of the displayed picture upon the reproduction of the recorded signals because the even field is interlased with the odd field when the odd field signals are to be recovered after the recording of the even field signals (or vice versa), and then the phase of even field signals is different half of one horizontal scanning period from the phase of odd field signals.

Therefore, no problem arises if the signals to be recorded on the magnetic disc memory are always predetermined to be the signals of either odd or even field. It will be apparent that the apparatus provided with the erasing head dispenses with such a requirement with the result of removal of the flip-flop circuit 120 as shown in FIG. 3. It is to be noted, in such a case, that a generator is to be provided for generation of the erasing signal.

Figure 5:
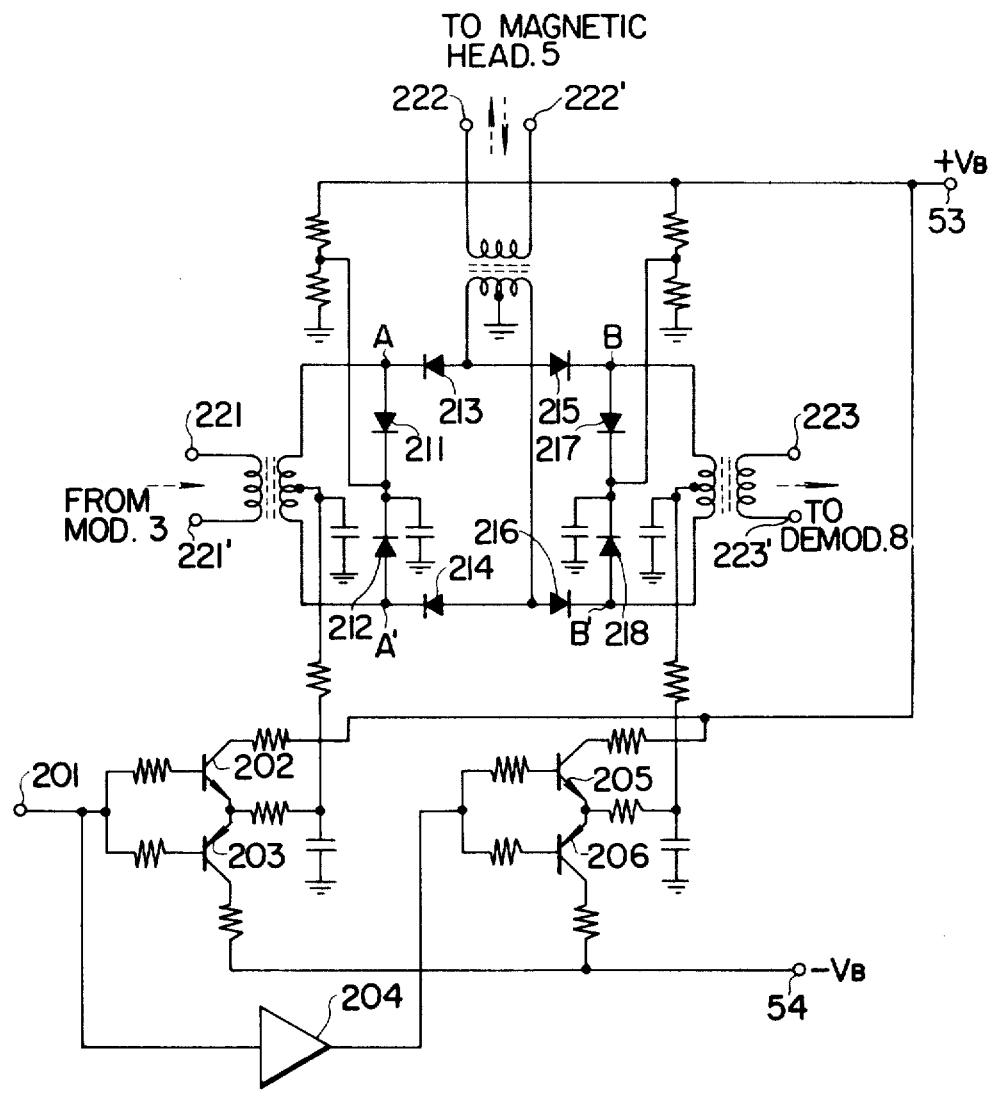
FIG. 5 is a circuit diagram showing a particular embodiment of a switching circuit 4 as shown in FIG. 1.

FIG. 5 shows a particular embodiment of the switching circuit 4. The circuit serves to change-over or switch a signal transmitting path by applying a forward bias or backward bias voltage to diodes thereby to transmit or interrupt the signals in dependence on the conductive or non-conductive state of these diodes. The numerals 221 and 221' show terminals to which the modulated video signals are applied for recording on the magnetic disc memory device 29. The numeral 222, and 222' show terminals connected to the magnetic head. The numeral 223 and 223' show terminals at which the signals boosted by the magnetic head develop. The numeral 201 shows a terminal to which the signal from the control signal generator 40 is applied.

The signal applied to the terminal 201, as shwon in FIG. 4f, has the level near to the positive voltage $+V_B$ of the power supply in the normal state, so that the voltage causes the transistor 202 to be rendered conductive. As a result, the positive voltage $+V_B$ of the power supply applied to the terminal 53 appears at points A and A' through two resistors and the collector-emitter connection of the transistor 202 with the result that diodes 211 and 212 are turned on while diodes 213 and 214 are cut off. Consequently, the signals applied across the terminal 221 and 221' are short-circuited by the diodes 211 and 212 without any transmission to the magnetic head. The signal appearing at the terminal is simultaneously supplied to a polarity inverter 204 and applied to bases of transistors 205 and 206 with its polarity inverted, i.e., as a negative voltage. This leads to the state of the cut-off transistor 205 and the turned-on transistor 206 with the negative voltage $-V_B$ of the power supply appearing at points B and B'. As a result, diodes 215 and 216 are turned on and diodes 217 and 218 are cut off to transmit the signals picked up by the magnetic head to output terminals 223 and 223'. Thus, in the normal state, the magnetic head 5 is supplied with no output signals from the modulator 3 and the demodulator 8 is supplied with the output signals from the magnetic head 5, so that the signals recorded on the magnetic head 6 are repeatedly reproduced for display on the cathode-ray tube 10.

The application of the instructional signal 15 to the control signal generator 40 causes the pulse 18 as shown in FIG. 4f to be generated. The application of the pulse 18 to the terminal 201 allows the transistor 202 to be cut off and the transistor 203 to be turned on only during the period of the pulse width, with the points A and A' becoming the negative potential in reversed relation to the above state, thus cutting off the diodes 211 and 212 while turning on the diodes 213 and 214. Further, the pulse 18, inverted by the polarity inverter 204, is applied to the base of the transistors 205 and 206 with the result that the transistor 205 is turned on and that the transistor 206 is cut off. Consequently, the points B and B' become a positive voltage with the diodes 215 and 216 cut off and with the diodes 217 and 218 turned on. As a result, the signals applied to the terminals 221 and 221' are transmitted to the magnetic head 5 throuugh the terminals 222 and 222' for recording on the magnetic disc 6 while no signal appears at the terminals 223 and 223'. One field signal supplied to the input terminals 221 and 221' is applied to the magnetic head 5 when the pulse 18 is supplied to the terminal 201. A signal line from the input terminals 221 and 221' to the magnetic head 5 becomes conductive state and a signal line from the input terminals 221 and 221' to the terminals 223 and 223' becomes nonconductive state when the pulse 18 is supplied to the terminal 201. The pulse width of the pulse 18 is equal to one field period, so that one field signal supplied to input terminals 221 and 221' is applied to the magnetic head 5. The signal line from input terminals 221 and 221' to the magnetic head 5 becomes nonconductive state and the signal line from the input terminals 221 and 221' to the terminals 223 and 223' becomes conductive state when the pulse 18 is not supplied to the terminal 201. Accordingly, the recorded signal on the magnetic disc 6 is reproduced repeatedly until a new pulse 18 is applied.

Figure 6:
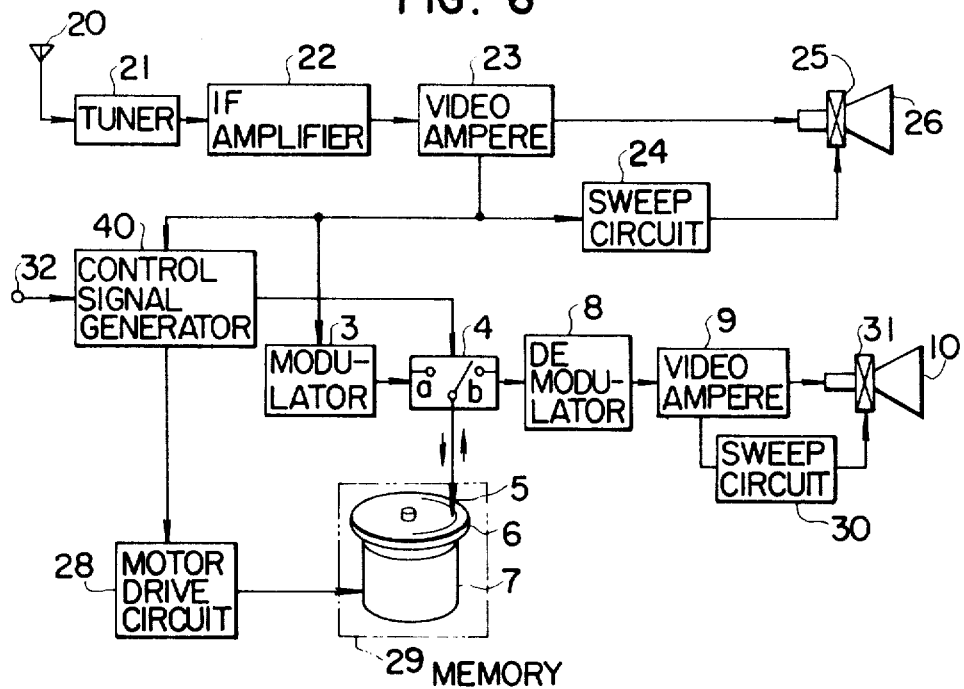
FIG. 6 is a block diagram showing another embodiment according to the present invention.

FIG. 6 shows a block diagram showing another embodiment of the present invention wherein a device for receiving a regular telecast to produce a regular video motion picture is combined with a device for displaying a stop motion picture independently thereof.

In FIG. 6, a common television receiver set adapted for use in receiving telecast electromagnetic waves for video picture production comprises a receiving antenna, a tuner 21, a video intermediate-frequency amplifier 22 including a detector, a video signal amplifier 23, a sweep circuit 24 for effecting vertical and horizontal scannings, deflecting coils 25 and a cathode-ray tube 26. It is to be noted that voice circuits are omitted from the block diagram because they have no particular relation thereto. To the above-mentioned arrangement there is additionally provided the previously described reproducing apparatus for stop motion picture comprising the control signal generator 40 for effecting control of the recording and the reproducing, an input terminal 32 to which the instructional signal is applied to take out the video signals of one field, the magnetic disc memory device 29 including the magnetic head 5, the magnetic disc 6 and the motor 7, a drive circuit 28 for driving the motor 7 of the magnetic memory device 29, a sweep circuit 30 for effecting horizontal and vertical scannings, and deflecting coils 31. The other arrangements are the same as those shown in FIG. 1.

When the motion picture is, as desired, to be recorded as a stop motion picture during the regular display of the video motion picture on the cathode-ray tube 26, the pulse 15 as shown in FIG. 2c or FIG. 4c is applied to the instructional signal input terminal 32. The application of this pulse 15 causes the pulse 18 to be produced from the control signal generator 40 to control the switching circuit 4. As a result, the switching circuit 4 is changed-over to the side a of the modulator 3 to thereby apply the frequency-modulated video signals to the magnetic head 5 through the modulator 3 for recording of the video motion picture corresponding to one field on the magnetic disc 6. Upon the completion of recording of the video motion picture corresponding to one field, the switching circuit 4 is immediately changed-over to connect the magnetic head 5 to the side b of the demodulator 8 because the input to the switching circuit 4 is returned to the original voltage by the termination of the pulse 18. Consequently, the video motion picture of one field is reproduced immediately subsequent to the completion of the recording thereof, and is then displayed as the stop motion picture on the cathode-ray tube 10 through the demodulator 8 and the video signal amplifier 9.

The motor drive circuit 28 produces a motor driving signal in synchronism with the vertical synchronizing signal generated from the sunchronization separator 140 in the control signal generator 40. A particular example of the block diagram of the motor drive circuit 28 is shown in FIG. 7.

The numeral 71 shows such an oscillator as an astable multivibrator the frequency of which varies with the control voltage, and the free oscillating frequency of which is selected at the frequency twice as high as that of the vertical synchronizing signal, i.e., approximately to 120 Hz. The output signal of the oscillator 71 is converted by a flip-flop circuit 72 to reduce the frequency by a half and to form the rectangular signal having perfectly 50 % of a duty cycle. The signal is amplified to a suitable level by an amplifier 73 and a motor drive amplifier 74 and then supplied from an output terminal 75 to the motor 7 of the memory device 29. The deviation from 50 % of the duty cycle of the rectangular signal for motor driving often causes the irregularity of rotation.

The portion of the output signal from the flip-flop circuit 72 is applied to a monostable multivibrator 65 through an amplifier 66 to alter the duty cycle to a suitable level. This is intended to adjust the duty cycle of the wave converted to the trapezoidal form to be just 50 %. The output signal from the monostable multivibrator 65 is converted to a trapezoidal signal by a wave shape circuit 64 comprising a bootstrap circuit and is then applied to a point III of a diode bridge 63. To points I and II of the diode bridge 63 there are applied the vertical synchronizing signals of positive and negative polarities, respectively. In other words, to the input terminal 60 there are applied the vertical synchronizing signals (FIG. 4a) separated by the synchronization separator 140 as shown in FIG. 3. After the signal is amplified to a suitable level by an amplifier 61, a series of pulses of negative polarity are applied to the point I and a series of pulses rendered of positive polarity through a polarity inverter 62 are applied to the point II, respectively. This connection allows all the diodes to be rendered conductive only for an instant during which the vertical synchronizing pulse is applied, thereby transmitting the signal applied to the point III to the point IV only during the period of time corresponding to the pulse duration of the vertical synchronizing pulse. As a result, the vertical synchronizing pulse provides a gate to the output signal from the wave shape circuit. The gated signal developing at the point IV of the diode bridge circuit 63 is amplified by an amplifier 67 and smoothed by an integrator 68. The signal is supplied as a control voltage to the oscillator 71 through a limiter 69 and an amplifier 70 for oscillation frequency control. If the oscillation frequency of the oscillator 71 is set just to 120 Hz by a voltage generated at the output of the amplifier 70 during the time when the vertical synchronizing signal provides a gate to a voltage at the center of the inclined portion of the trapezoidal wave, then automatic oxcillation control is effected to produce the motor driving signal in synchronism with the vertical synchronizing signal because the voltage appearing at the point IV of the diode bridge 63 is proportional to the variation of the frequency in the case where the oscillation frequency varies.

The limitter 69 serves to prevent the voltage above a predetermined level from being applied to the oscillator 71, thus preventing the oscillation frequency from being made subjected to a wide fluctuation when the gated signal voltage undergoes an extraordinary variation due to an influence such as noise or the like.

In FIG. 6, to the deflecting coil 31 of the cathode-ray tube 10 for displaying the stop motion picture there is applied an output signal from the sweep circuit 30 in synchronizm with the synchronizing signal contained in the video signals which are reproduced from the magnetic disc memory device 29, so that the sweep circuit 30 operates independently of the sweep circuit 24 located at the side of the cathode-ray tube 26 for displaying the regular video motion picture. This arrangement can eliminate the drawback to be described hereunder. The repeated reproduction of the video signal recorded only during the period of time of one field causes the time corresponding to one field to fluctuate by the reason of the rotational irregularity of the motor 7. Further, the position at which the synchronizing pulse of the recorded video signal develops varies even if the motor 7 effects accurate rotation because the synchronizing signal contained in the received video signals alters its relative position when a camera or other apparatus is switched at the side of the telecast station or when the receiving channel is changed-over. For this reason, there arise problems of the fluctation of the reproduced motion picture or the appearance of the blanking period on the field when the deflection of the cathode-ray tube 10 for displaying the stop motion picture is provided by the sweep circuit 24 in the regular video picture display circuit. The elimination of these problems by controlling the magnetic disc memory device 29 results in a very complicated control circuitry with a high cost. Therefore, as mentioned above, the sweep circuit 30 for scanning the stop motion picture displaying cathode-ray tube 10 is synchronized with the synchronizing signal of the signals reproduced from the magnetic disc memory device 29 with the result that the stop motion picture is reproduced without any influence even though the time corresponding to one field varies due to the rotational irregularity of the motor 7 because the sweep circuit 30 follows the variation.

Figure 8:
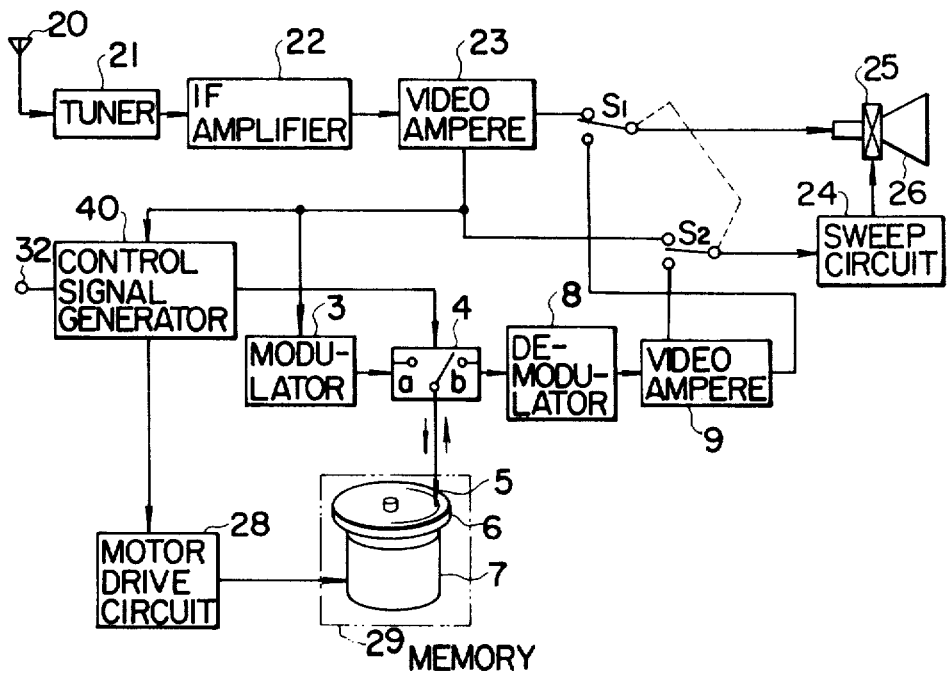
FIG. 8 is a block diagram showing a still another embodiment according to the present invention.

FIG. 8 shows a block diagram showing a still further embodiment of the present invention in which the cathode ray tube for displaying the regular video motion picture serves also as the cathode ray tube for displaying the recorded stop motion picture and is adapted for alternative and selective use therewith. This embodiment differs from that shown in FIG. 6 in that only one cathode ray tube 26 is employed consequently with one set of deflecting coil 25 and sweep circuit 24 required and that a video signal changing-over switch S₁ and a synchronizing singal changing-over switch S₂ are additionally provided.

When the telecasting is received to view the regular video motion picture, the switches S₁ and S₂ are changed over to apply the video signal and the synchronizing signal to the cathode ray tube 26 and the sweep circuit 24, respectively. In order to display the stop motion picture on the cathode-ray tube 26, the swithches S₁ and S₂ may be changed over to the other side of the video signal amplifier 9. The description of the other operations will be omitted because they are the same as those shown in FIG. 6 or in the other figures. This arrangement permits no viewing of the successively varying regular video motion picture when the stop motion picture is to be viewed, but makes the whole apparatus small-sized because of the provision of only one cathode ray tube.

As mentioned above, according to the present invention, any one instantaneous scene can be taken out of the video motion pictures varying with the lapse of the time for viewing as the stop motion picture during the time required. Therefore, during viewing of broadcasting programs, for example, a sporting program, any instantaneous form of its movement can be viewed as being stationary, as desired. Further, when information displayed on the scene is to be recorded, the displaying of the scene as the stop motion picture advantangeously allows one to effect slow transcription of the information even if the scene on the broadcast has been changed.

Further, if the signal for instructing the extraction of one scene from the video signals varying with the lapse of time is superimposed on the telecast electromagnetic waves, then it is possible to view with ease the scene addressed by the telecast station as the stop motion picture.

What we claim is:

1. A recording and reproducing apparatus for recording and reproducing one field television signal selected from multiple television signals comprising:
    a television signal source for generating said multiple television signals having vertical synchronizing signals;
    a modulator whose input terminal is supplied with said multiple television signals generated from said television signal source for producing modulated multiple television signals suitable for recording;
    a single magnetic disc which is rotated at a rate of one revolution per one field period for storing a modulated one field television signal selected from said modulated multiple television signals;
    a single fixed head for recording said modulated one field television signal on said magnetic disc together with erasing an unnecessary signal previously recorded on said magnetic disc by said modulated one field television signal supplied to said head and for taking out said modulated one field television signal stored on said magnetic disc repeatedly upon completion of the recording of said modulated one field television signal;
    a demodulator for demodulating said modulated one field television signal taken out of said magnetic disc to deliver a stop motion picture signal as its output;
    means for producing a pulse train which is in synchronism with said vertical synchronizing signals and has a repetition frequency half as low as that of said vertical synchronizing signals and a pulse width equal to one field period of said multiple television signal;
    means for producing a trigger pulse at any instant when desired;
    means responsive to said trigger pulse for taking out of said pulse train as a control pulse a pulse following said trigger pulse;
    first switching means connected between said modulator and said head, said first switching means being conductive state during a period when said control pulse is supplied thereto for transmitting said modulated one field television signal from said modulator to said head;
    second switching means connected between said head and said demodulator, said second switching means being conductive state during a period when said control pulse is not supplied thereto for transmitting said modulated one field television signal taken out of said disc to said demodulator.

2. A recording and reproducing apparatus according to claim 1, wherein said television signal source is a television receiver including a television tuner, a television signal processing circuit and a display device for displaying a moving picture corresponding to received television signal.

3. A recording and reproducing apparatus according to claim 2, wherein there is provided another display device for reproducing said one field television signal demodulated by said demodulator so as to display the stop motion picture on said another display device.

4. A recording and reproducing apparatus according to claim 2, wherein there is further provided a switch connected to said display device for selectively connecting said display device to one of said demodulator and said television signal processing device of said television receiver so as to selectively display on said display device one of said stop motion picture and said moving picture.

5. A recording and reproducing apparatus for recording and reproducing a single field television signal selected from a composite video signal comprising:
    a television signal source for generating a composite video signal including vertical synchronizing signals;
    a modulator whose input terminal is supplied with said composite signal generated from said television signal source for producing a modulated composite video signal suitable for recording;
    recording means including a single magnetic disc which is rotated at a rate of one revolution per single field period for storing a modulated single field video signal selected from said modulated composite video signal;
    means comprising a single fixed recording-reproducing head for recording said modulated single field television signal on said magnetic disc as well as erasing an unnecessary signal previously recorded on said magnetic disc by said modulated single field television signal supplied to said head and for taking out said modulated single field television signal stored on said magnetic disc repeatedly upon completion of the recording of said modulated single field television signal;

a demodulator for demodulating said modulated single field television signal taken out of said magnetic disc to deliver a stop motion picture signal as its output;

control signal generator means for selectively producing a control pulse having a width equal to one field period of said composite signal comprising first control means for producing a pulse train which is in synchronism with said vertical synchronizing signals and has a repetition frequency half that of said vertical synchronizing signals so that said pulse train is in synchronism with the odd or even field period of said composite video signal; means for manually producing a trigger pulse at any instant when desired; and means responsive to said trigger pulse for generating said control pulse in synchronism with the next pulse of said pulse train following said trigger pulse;

first switching means connected between said modulator and said recording-reproducing head, said first switching means being in a conductive state only during a period when said control pulse is supplied thereto for transmitting said modulated single field television signal from said modulator to said recording-reproducing head;

second switching means connected between said head and said demodulator, said second switching means being in a conductive state only during a period when said control pulse is not supplied thereto for transmitting said modulated single field television signal taken out of said magnetic disc to said demodulator.

6. A recording and reproducing apparatus according to claim 5, wherein said television signal source is a television reciever including a television tuner, a television signal processing circuit and a display device for displaying a moving picture corresponding to the received television signal.

7. A recording and reproducing apparatus according to claim 6, wherein there is provided another display device for reproducing said one field television signal demodulated by said demodulator so as to display the stop motion picture on said another display device.

8. A recording and reproducing apparatus according to claim 6, wherein there is further provided a switch connected to said display device for selectively connecting said display device to one of said demodulator and said television signal processing device of said television receiver so as to selectively display on said display device one of said stop motion picture and said moving picture.

* * * * *